(12) United States Patent
Sasaki et al.

(10) Patent No.: US 7,077,484 B2
(45) Date of Patent: Jul. 18, 2006

(54) BRAKE CONTROL FOR VEHICLE

(75) Inventors: Hiroki Sasaki, Yokohama (JP); Hideo Nakamura, Yokohama (JP); Junji Tsutsumi, Kanagawa (JP); Kazuhiko Tazoe, Kanagawa (JP); Hidetoshi Suzuki, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/254,571

(22) Filed: Sep. 26, 2002

(65) Prior Publication Data
US 2003/0062770 A1 Apr. 3, 2003

(30) Foreign Application Priority Data
Sep. 27, 2001 (JP) .............................. 2001-298529
Jul. 3, 2002 (JP) .............................. 2002-194241

(51) Int. Cl.
*B60T 8/64* (2006.01)
(52) U.S. Cl. .................. 303/152; 303/3; 303/9.62; 303/15; 303/113.1; 303/155
(58) Field of Classification Search .............. 303/3, 303/9.62, 15, 147, 150, 152, 154, 155, 113.1, 303/113.5, 3 X, 9.62 X, 15 X, 155 X, 113.1 X
See application file for complete search history.

(56) References Cited

U.S. PATENT DOCUMENTS

| | | | | |
|---|---|---|---|---|
| 5,253,929 A * | 10/1993 | Ohori | ............................. | 303/3 |
| 5,318,355 A * | 6/1994 | Asanuma et al. | .............. | 303/3 |
| 5,378,053 A * | 1/1995 | Patient et al. | .................. | 303/3 |
| 5,399,000 A | 3/1995 | Aoki et al. | | |
| 5,472,265 A * | 12/1995 | Ohnuma | ......................... | 303/3 |
| 5,511,859 A * | 4/1996 | Kade et al. | ..................... | 303/3 |
| 5,568,962 A * | 10/1996 | Enomoto et al. | .............. | 303/3 |
| 5,615,933 A * | 4/1997 | Kidston et al. | ............. | 303/152 |
| 6,021,365 A * | 2/2000 | Ishii et al. | ..................... | 701/22 |
| 6,099,089 A * | 8/2000 | Schneider | ................... | 303/152 |
| 6,132,015 A * | 10/2000 | Aoyama | ..................... | 303/152 |
| 6,179,395 B1 * | 1/2001 | Schneider | ................... | 303/152 |
| 6,231,134 B1 * | 5/2001 | Fukasawa et al. | ......... | 303/152 |
| 6,325,470 B1 * | 12/2001 | Schneider | ................... | 303/152 |
| 6,588,860 B1 * | 7/2003 | Kosik et al. | ................ | 303/152 |
| 2002/0180262 A1 * | 12/2002 | Hara et al. | ............... | 303/119.1 |
| 2002/0180266 A1 * | 12/2002 | Hara et al. | .................. | 303/152 |

FOREIGN PATENT DOCUMENTS

| | | |
|---|---|---|
| JP | 5-161209 | 6/1993 |
| JP | 5-161210 | 6/1993 |
| JP | 5-161212 | 6/1993 |
| JP | 5-161213 | 6/1993 |
| JP | 8-98313 | 4/1996 |
| JP | 10-297462 | 11/1998 |
| JP | 11-301436 | 11/1999 |
| JP | 11-321625 | 11/1999 |
| JP | 2000-184505 | 6/2000 |

* cited by examiner

*Primary Examiner*—Devon Kramer
(74) *Attorney, Agent, or Firm*—Foley & Lardner LLP (57) ABSTRACT

A brake control apparatus for a vehicle includes an actuating section to apply a regenerative braking force to a motor-driven wheel driven by a motor of the vehicle. A control section is arranged to vary the regenerative braking force in a direction to shift a front and rear wheel braking force distribution toward an ideal braking force distribution, in accordance with a wheel locking tendency of the motor-driven wheel when the regenerative braking force exceeding a braking force determined by the ideal braking force distribution is applied to the motor-driven wheel.

15 Claims, 8 Drawing Sheets

BRAKE CONTROL FOR VEHICLE

BACKGROUND OF THE INVENTION

The present invention relates to brake control apparatus and/or process for a vehicle having at least one wheel powered by an electric motor, and more specifically to brake control technique for controlling a braking force distribution between front and rear axles of a vehicle.

To improve energy recovery efficiency, a brake control system of one example is arranged to apply, to drive wheels powered by a motor, a regenerative braking force exceeding a braking force corresponding to an ideal braking force distribution. In the case of a vehicle equipped with an anti-skid brake control (wheel slip brake control) function, a brake control system of one approach cancels a regenerative braking to drive wheels powered by a motor when an anti-skid brake control operation is started.

SUMMARY OF THE INVENTION

The application of the regenerative braking force beyond the allotment of the ideal distribution tends to increase the locking tendency of the motor-driven wheels, and to trigger the anti-skid brake control operation with the result of cancellation of the regenerative braking. In this case, however, the cancellation of the regenerative braking is contradictory to the intended purpose of improvement of the energy recovery efficiency. The application of the regenerative braking force beyond the baking force determined by the ideal distribution can cut off the possibility of continuation of energy recovery with the regenerative braking.

It is an object of the present invention to provide brake control apparatus and/or process for improving the efficiency in energy recovery by controlling a regenerative braking force. It is another object of the invention to provide brake control apparatus and/or process to continue the energy recovery with regenerative braking, by controlling the front and rear axle braking force distribution adequately according to the ideal braking force distribution so as to restrain a start of anti-skid brake control.

According to the present invention, a brake control apparatus for a vehicle, comprises: ba brake section to apply a regenerative braking force to a motor-driven wheel driven by a motor; and a control section to vary the regenerative braking force in a direction to shift a front and rear wheel braking force distribution toward an ideal braking force distribution, in accordance with a wheel locking tendency of the motor-driven wheel when the regenerative braking force exceeding a braking force determined by the ideal braking force distribution is applied to the motor-driven wheel.

According to another aspect of the invention, a brake control process for a vehicle having a brake system to apply a regenerative braking force to a motor-driven wheel driven by a motor, comprises: calculating a wheel locking tendency of the motor-driven wheel which is driven by the motor; and varying the regenerative braking force to the motor-driven wheel in a direction to shift a front and rear wheel braking force distribution of the vehicle toward an ideal braking force distribution, in accordance with the wheel locking tendency of the motor-driven wheel when the regenerative braking force exceeding a braking force determined by the ideal braking force distribution is applied to the motor-driven wheel. According to still another aspect of the present invention, a brake control apparatus comprises: motor regulating means for varying a regenerative braking force applied to the drive wheels; wheel locking condition sensing means for sensing a wheel locking condition of the drive wheels; and braking force controlling means for varying the regenerative braking force in a direction to shift a front and rear wheel braking force distribution of the vehicle toward an ideal braking force distribution, in accordance with the wheel locking tendency when the regenerative braking force exceeding a braking force determined by the ideal braking force distribution is applied to the motor-driven wheel.

The other objects and features of this invention will become understood from the following description with reference to the accompanying drawings.

DETAILED DESCRIPTION OF THE INVENTION

Figure 1:
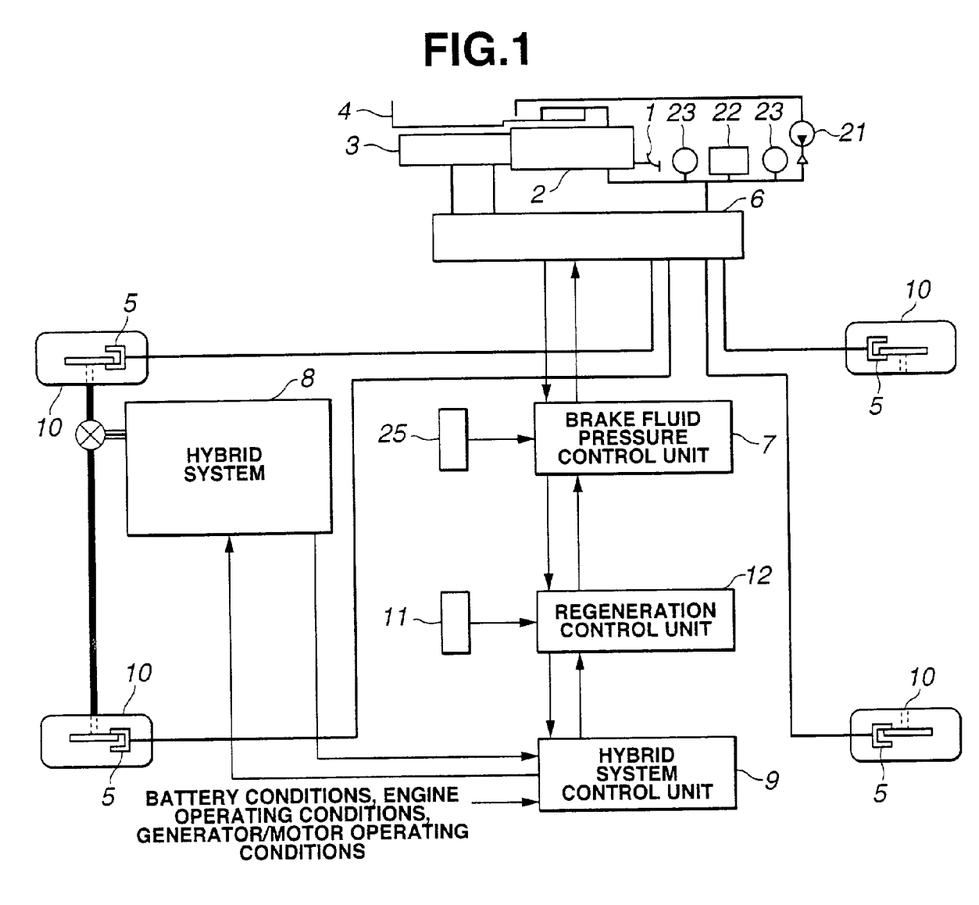
FIG. 1 is a schematic view showing a vehicle equipped with a brake control apparatus according to a first embodiment of the present invention.

FIG. 1 shows a vehicle equipped with a brake control apparatus according to a first embodiment of the present invention. In this embodiment, the present invention is applied to a cooperative regeneration brake control system arranged to control a brake fluid pressure in a pressure decrease mode during control of a regenerative brake torque by an ac synchronous motor, and thereby to recover regenerative energy efficiently.

A brake pedal 1 to be operated by the driver is connected through a booster 2 with a master cylinder 3. Booster 2 utilizes a high pressure brake fluid pressurized by a pump 21 and stored in an accumulator 22, to increase the effectiveness of pedal force, and supplies the increased force to master cylinder 3. Pressure switches 23 are used for controlling pump 21 in sequential control. There is further provided a reservoir 4 for storing the brake fluid.

A brake fluid pressure circuit 6 is interposed between master cylinder 3 and wheel cylinders 5 of wheels 10 of the vehicle, and arranged to control the brake fluid pressures of wheel cylinders 5 individually. In response to a command brake fluid pressure from a brake fluid pressure control unit 7, this pressure circuit 6 can control the wheel cylinder fluid pressure for each wheel cylinder 5 by increasing the wheel cylinder pressure by connecting master cylinder 4 with a stroke simulator having a fluid load equal to that of the wheel cylinder and instead supplying the output pressure of pump 21 or the pressure stored in accumulator 22 to the wheel cylinder 5; or by decreasing the wheel cylinder pressure by returning the fluid pressure from the wheel cylinder 5 to reservoir 4. In this example, there are provided, in fluid pressure circuit 6, a master cylinder pressure sensor for sensing the output pressure of master cylinder 3, and wheel cylinder pressure sensors each for sensing the fluid pressure in one wheel cylinder 5 in the state separated from master cylinder 3. Sensed master cylinder pressure and wheel cylinder pressures are supplied to brake fluid pressure control unit 7.

Brake fluid pressure control unit 7 is a control unit to control the brake fluid pressure of each wheel cylinder 5 by delivering a control signal representing a command brake fluid pressure to brake fluid pressure circuit 6. Moreover, brake fluid pressure control unit 7 of this example has a function of anti-skid brake control. Therefore, pressure control unit 7 can control rotational wheel slip of each wheel to a desired range to ensure the brake stopping distance and steering ability by decreasing the wheel cylinder pressure when the actual wheel speed decreases below a target wheel speed determined from a vehicle body speed, and increasing the wheel cylinder pressure when the actual wheel speed increases beyond target wheel speed. To this end, a signal from a brake pedal switch 25 and wheel speeds are inputted to pressure control unit 7. In this example, pressure control unit 7 is arranged to calculate an estimated vehicle body speed from the sensed wheel speeds to achieve accurate anti-skid brake control performance, as in a known anti-skid control system.

A hybrid system 8 of this example is arranged to drive the front wheels 10 of the vehicle. Hybrid system 8 of this example includes a combination of an engine and an ac synchronous motor, a so-called generator/motor, and drives the front wheels by effective use of the characteristics of the engine and motor. The generator/motor receives the supply of power from a battery and drives the motor-driven wheels 10 as electric motor. Moreover, the generator/motor receives a driving torque from the road surface transmitted through the wheels 10 as generator, and stores electric energy in the battery. At the time of recovery of energy to the battery, the road driving torque is consumed to rotate the generator/motor, and consequently, a braking force is applied to the motor-driven (front) wheels powered by the motor. This is known as regenerative braking. In this embodiment, the regenerative braking system is arranged to supply, as regenerative braking force, to the front drive wheels, the braking force exceeding the braking force determined by an ideal braking force distribution between the front drive wheels and the rear non-drive wheels.

A hybrid system control unit 9 controls hybrid system 8 by producing a control signal. In this example, hybrid system control unit 9 controls the drive conditions of the engine and generator/motor and the regenerative braking condition of the generator/motor. For example, hybrid system control unit 9 stops the operation of the engine at a stop of the vehicle, produces a driving force to start the vehicle by operating the generator/motor as electric motor, and operates the engine to drive the front wheels with the driving force of the engine when the vehicle speed is increased. During a coasting operation or deceleration of the vehicle, hybrid system control unit 9 separates the front wheels from the engine and applies the regenerative braking force to the front wheels by operating the generator/motor as generator. To this end, hybrid system control unit 9 receives information on battery conditions, engine operating conditions, and generator/motor operating conditions.

A cooperative regeneration control unit 12 is connected with brake fluid pressure control unit 7 and hybrid system control unit 9 through communication lines. Brake fluid pressure control unit 7 can control the wheel cylinder pressure singly, and hybrid system control unit 9 can control hybrid system 8 singly. However, these control units 7 and 9 can control the respective controlled variables more efficiently under the control of cooperative regeneration control unit 12, and thereby improve the fuel efficiency with effective recovery of kinetic energy of the vehicle.

Hybrid system control unit 9 of this example controls the regenerative braking force in response to a command regenerative braking force sent from cooperative regeneration control unit 12, calculates a maximum regenerative braking force from the state of charge and temperature of the battery, and supplies the result of the calculation to cooperative regeneration control unit 12. Brake fluid pressure control unit 7 controls the brake fluid pressure of each wheel cylinder 5 in response to a command brake fluid pressure sent from cooperative regeneration control unit 12, and sends, to cooperative regeneration control unit 12, the master cylinder pressure sensed by the master cylinder pressure sensor, wheel cylinder pressures sensed by the wheel cylinder pressure sensors, the sensed wheel speeds and estimated vehicle body speed for the anti-skid brake control and a regenerative braking cancel signal to cancel the regenerative braking upon a start of the anti-skid control. In the example shown in FIG. 1, there is further provided a road surface friction sensing device 11 for sensing a road surface friction coefficient μ (mu). Road surface friction sensing device 11 is a device for sensing road surface friction coefficient from lateral acceleration and longitudinal acceleration of the vehicle, or from a slip condition of the drive wheels with respect to the driving force, or by using communication with the outside such as communication with road-side facilities. The road surface friction coefficient is supplied from sensing device 11 to cooperative regeneration control unit 12.

Each of control units 7, 9 and 12 includes at least one microcomputer or processing unit. Brake fluid pressure control unit 7 and hybrid system control unit 9 are arranged to operate the respective actuators by producing control signals or drive signals in response to the command hydraulic braking forces and command regenerative braking force, respectively. On the other hand, cooperative regeneration control unit 12 calculates the command hydraulic braking forces and command regenerative braking force to achieve a deceleration suitable to driver's intention, and to maximize the recovery efficiency of vehicle kinetic energy; and supplies the results of the calculation to brake fluid pressure control unit 7 and hybrid system control unit 9.

Figure 2:
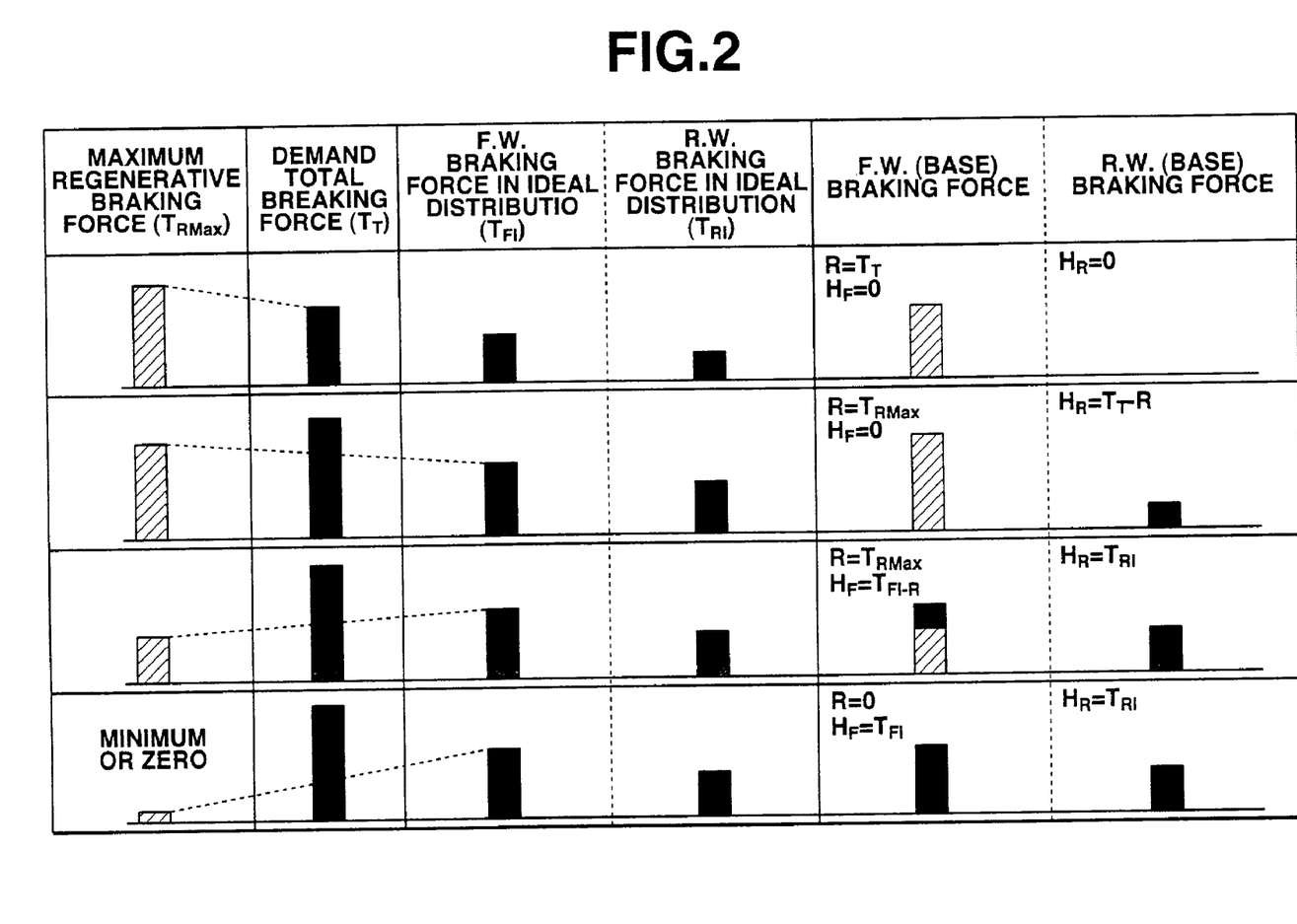
FIG. 2 is a view for illustrating braking force setting patterns used in a cooperative regeneration control unit shown in FIG. 1.

The brake control system according to this embodiment basically controls the distribution between front wheel braking force and rear wheel braking force in the following manner. An object of this front and rear wheel braking force distribution is to make full use of the regenerative braking force and thereby to improve the energy recovery efficiency. When the braking force of each wheel is limited as mentioned later, the braking force is distributed in dependence on a limit value of the limitation. In this example, there are four patterns as shown in FIG. 2.

In the first case in which the maximum regenerative braking force (TRMax) is sufficiently great, a driver's demand total braking force (TT) demanded by the driver is smaller than the maximum regenerative braking force (TRMax), and at the same time the drive wheel (front wheel in this example) braking force (TFI) obtained by the ideal braking force distribution of the demand total braking force is smaller than the maximum regenerative braking force; the brake control system of this embodiment utilizes only the regenerative braking, by setting the drive wheel (front wheel) regenerative braking force (R) equal to a regenerative braking force corresponding to the demand total braking force (R=TT), and setting each of the front wheel and rear wheel hydraulic braking forces (HF and HR) equal to zero (HF=0, HR=0). In the first case, the braking force apportioned to the front wheels is great.

In the second case in which the maximum regenerative braking force is relatively great, the driver's demand total braking force is greater than or equal to the maximum regenerative braking force, and at the same time the drive (front) wheel braking force obtained by the ideal distribution of the total demand braking force is smaller than the maximum regenerative braking force; the brake control system of this embodiment utilizes the regenerative braking and the rear wheel hydraulic braking, by setting the drive (front) wheel regenerative braking force equal to the maximum regenerative braking force (R=TRMax), setting the front wheel hydraulic braking force equal to zero (HF=0), and setting the rear wheel hydraulic braking force equal to a difference obtained by subtracting the maximum regenerative braking force from the demand total braking force (HR=TT−R). In the second case, too, the braking force apportioned to the front wheels is great.

In the third case in which the maximum regenerative braking force is relatively small, the driver's demand total braking force is greater than or equal to the maximum regenerative braking force, and at the same time the drive (front) wheel braking force determined by the ideal distribution of the demand total braking force is greater than or equal to the maximum regenerative braking force; the brake control system of this embodiment utilizes the regenerative braking and the front and rear wheel hydraulic braking, by setting the non-drive wheel (rear wheel) hydraulic braking force equal to the braking force determined by the ideal braking force distribution (HR=TRI), setting the drive wheel (front wheel) regenerative braking force equal to the maximum regenerative braking force (R=TRMax), and setting the front wheel hydraulic braking force equal to a difference obtained by subtracting the maximum regenerative braking force from the braking force determined by the ideal braking force distribution (HF=TFI−R). In the third case, the braking force is distributed properly between the front and rear axles.

In the fourth case in which the maximum regenerative braking force is very small or zero, the driver's total demand braking force is greater than or equal to the maximum regenerative braking force, and at the same time the drive (front) wheel braking force obtained by the ideal distribution of the demand total braking force is greater than or equal to the maximum regenerative braking force; the brake control system of this embodiment utilizes only the hydraulic braking, by setting the regenerative braking force equal to zero (R=0), and setting the front and rear wheel hydraulic braking forces equal to the respective braking forces determined by the ideal braking force distribution (HF=TFI, HR=TRI). Thus, in the fourth case, the braking force is distributed properly between the front and rear axles.

When, on the other hand, limitation is imposed on the front and rear wheel braking forces, the brake control system of this embodiment determines the front and rear wheel hydraulic braking forces and regenerative braking force by using limited values on the basis of these four basic patters.

Figure 3:
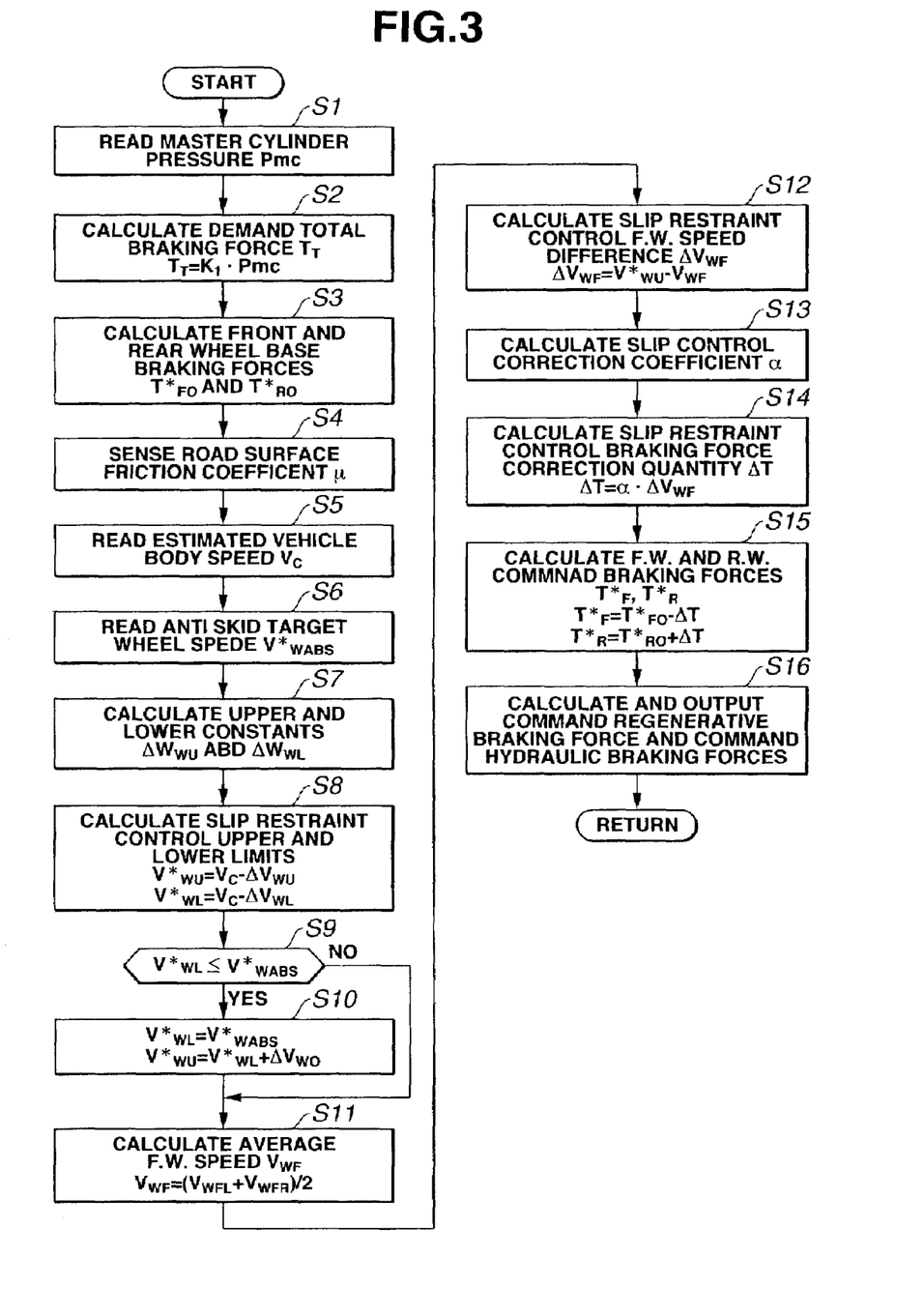
FIG. 3 is a flowchart showing a braking force calculating process performed by the cooperative regeneration control unit shown in FIG. 1.

FIG. 3 shows a control process performed in cooperative regeneration control unit 12 to calculate command brake fluid pressure (or hydraulic) braking forces, and a command regenerative braking force. In this example, the control process is executed by a timer interrupt at regular time intervals of a time length Δt (10 msec, for example). The results of calculation are stored in a memory and read out as required.

Step S1 of FIG. 3 reads a master cylinder pressure Pmc supplied from brake fluid pressure control unit 7. Next step S2 calculates a driver's total demand braking force TT by multiplying master cylinder pressure Pmc obtained at step S1, by a predetermined proportional coefficient K1 (TT=K1·Pmc). Step S3 calculates base front wheel and rear wheel braking forces T*F0 and T*R0 according to the braking force distribution shown in FIG. 2. Step S4 reads a road surface friction coefficient μ sensed by road surface friction sensing device 11.

Step S5 following step S4 reads estimated vehicle body speed Vc from brake fluid pressure control unit 7. Step S6 reads a target wheel speed V*wABS for anti-skid brake control, calculated by brake fluid pressure control unit 7. Target wheel speed V*wABS is used as a threshold for starting the ABS control, and as a target at which the ABS control is aimed.

Figure 4:
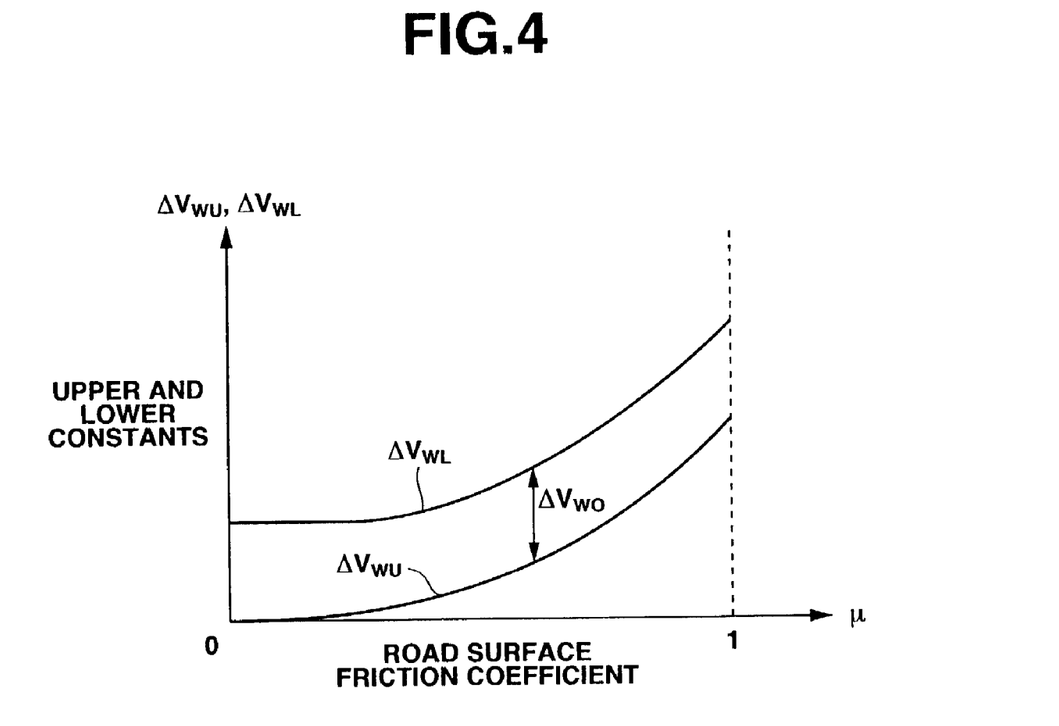
FIG. 4 is a graph showing a control map used at step S7 in the process of FIG. 3.

Then, step S7 calculates upper and lower limit setting constants ΔVwU and ΔVwL in accordance with road surface friction coefficient μ read at step S4, by using a control map shown in FIG. 4. Each of upper and lower limit setting constants ΔVwU and ΔVwL is represented by a curve which is convex downwards as shown in FIG. 4. Each constant ΔVwU or ΔVwL increases as the road surface friction coefficient μ increases, and the rate of increase of the constant with respect to increase in the friction coefficient μ increases as the road surface friction coefficient increases. Upper limit setting constant ΔVwU is always greater, by a predetermined quantity ΔVw0, than lower limit setting constant ΔVwL.

Then, step S8 calculates upper and lower slip restraint control limits V*wU and V*wL, respectively, by subtracting upper and lower limit setting constant ΔVwU or ΔVwL determined at step S7, from estimated vehicle body speed Vc obtained at step S5 (V*wU=Vc−ΔVwU; V*wL=Vc−ΔVwL). Next step S9 examines whether the lower slip restraint control limit VwL* calculated at step S8 is lower than or equal to the target anti-skid control wheel speed V*wABS obtained at step S6, or not. From step S9, control unit 12 proceeds to step S10 when V*wL≦V*wABS, and to step S11 when V*wL>V*wABS.

Step S10 sets target anti-skid brake control target wheel speed V*wABS to slip restraint control lower limit V*wL (V*wL=V*wABS), and sets a sum of this slip restraint control lower limit V*wL and a predetermined value ΔVwo, to slip restraint control upper limit V*wU (V*wU=V*wL+ΔVwo), and then transfers control to step S11. Step S11 calculates an average front wheel (drive wheel) speed VwF by averaging the front left wheel speed VwFL and front right wheel speed VwFR (VwF=(VwFL+VwFR)/2), and transfers control to step S12.

Figure 5:
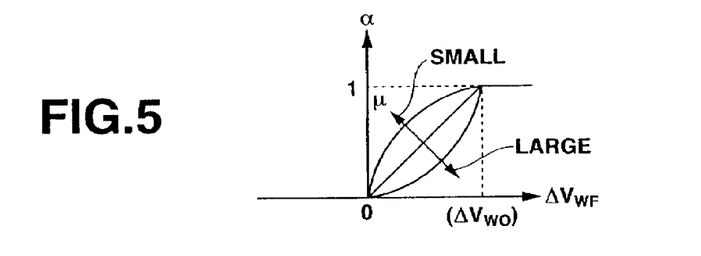
FIG. 5 is a graph showing a control map used at step S13 in the process of FIG. 3.

Step S12 calculates a slip restraint control front wheel speed difference ΔVwF by subtracting the average front wheel speed VwF determined at step S11, from the slip restraint control upper limit $V^*wU$ determined at step S8 or S10 ($\Delta VwF = V^*wU - VwF$), and transfers control to step S13. Step S13 calculates a slip restraint control correction coefficient $\alpha$ in accordance with slip restraint control front wheel speed difference $\Delta VwF$ determined at step S12, by using a control map shown in FIG. 5. This slip restraint control correction coefficient $\alpha$ is equal to zero in the region in which slip restraint control front wheel speed difference $\Delta VwF$ is equal to or smaller than zero. This slip restraint control correction coefficient $\alpha$ is equal to one in the region in which slip restraint control front wheel speed difference $\Delta VwF$ is equal to or greater than the predetermined value $\Delta Vwo$. Between 0 and $\Delta Vwo$, slip restraint control correction coefficient $\alpha$ increases gradually from zero to one with increase in slip restraint control front wheel speed difference $\Delta VwF$. In this example, the characteristic between slip restraint control correction coefficient $\alpha$ and slip restraint control front wheel speed difference $\Delta VwF$ is varied in dependence on road surface friction coefficient $\mu$. The inclined line along which the slip restraint control correction coefficient $\alpha$ increases with increase in the slip restraint control front wheel speed difference is bulged upward to a form which is convex upwards as road surface friction coefficient $\mu$ decreases; and is bulged downward to a form which is convex downwards as road surface friction $\mu$ increases, as shown in FIG. 5. Namely, for the same value of slip restraint control front wheel speed difference $\Delta VwF$, correction coefficient $\alpha$ increases as road surface friction coefficient $\mu$ becomes lower, and correction coefficient $\alpha$ decreases as road surface friction coefficient $\mu$ becomes higher.

At step S14 following step S13, cooperative regeneration control unit 12 calculates a slip restraint control braking force correction quantity $\Delta T$ by multiplying the slip restraint control front wheel speed difference $\Delta VwF$ determined at step S12, by the slip restraint control coefficient $\alpha$ determined at step S13 ($\Delta T = \alpha \cdot \Delta VwF$). Then, at step S15, cooperative regeneration control unit 12 calculates a command front wheel braking force $T^*F$ by subtracting slip restraint control braking force correction quantity $\Delta T$ determined at step S14, from the front wheel base braking force $T^*FO$ determined at step S3 ($T^*F = T^*FO - \Delta T$), and calculates a command rear wheel braking force $T^*R$ by adding slip restraint control braking force correction quantity $\Delta T$ determined at step S14, and the rear wheel base braking force $T^*RO$ determined at step S3 ($T^*R = T^*RO + \Delta T$).

At step S16, cooperative regeneration control unit 12 calculates the command regenerative braking force, and command front and rear wheel hydraulic braking forces in accordance with command front and rear wheel braking forces $T^*F$ and $T^*R$ determined at step S15, in the same manner as in step S3. These results are outputted and control is transferred to a main program.

When average front (drive) wheel speed $VwF$ is higher than slip restraint control upper limit $V^*wU$, the slip restraint control front wheel speed difference $\Delta VwF$ becomes negative, so that slip restraint control correction coefficient $\alpha$ becomes zero, slip restraint control correction quantity $\Delta T$ becomes zero, and command front and rear wheel braking forces $T^*F$ and $T^*R$ become equal to base braking forces $T^*Fo$ and $T^*Ro$, respectively. Thus, in an early stage of a braking operation, the brake control apparatus according to this embodiment controls the braking forces in an efficient energy recovery mode by using the front and rear wheel base braking forces $T^*Fo$ and $T^*Ro$ which are set to make the most use of the maximum regenerative braking force.

Figure 6:
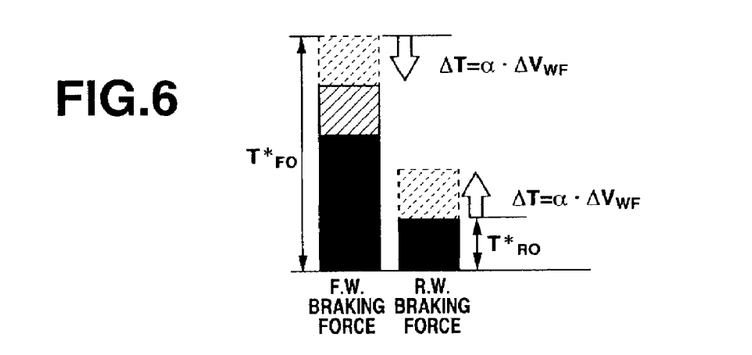
FIG. 6 is a graph illustrating adjustment of front and rear wheel braking forces performed by the process of FIG. 3.

When, on the other hand, average front (drive) wheel speed $VwF$ becomes lower than slip restraint control upper limit $V^*wU$, the slip restraint control front wheel speed difference $\Delta VwF$ becomes positive, so that slip restraint control correction coefficient $\alpha$ becomes equal to a positive value determined in dependence on slip restraint control front wheel speed difference $\Delta VwF$ and road surface friction coefficient $\mu$, slip restraint control correction quantity $\Delta T$ becomes positive, and command front and rear wheel braking forces $T^*F$ and $T^*R$ become equal to base braking force $T^*Fo$ minus correction quantity $\Delta T$ and base braking force $T^*Ro$ plus correction quantity $\Delta T$, respectively, as shown in FIG. 6. Therefore, the front (drive) wheel braking force is decreased and the rear (non-drive) wheel braking force is increased while the total braking force remains unchanged, and the deceleration acting on the vehicle remains unchanged.

Figure 7:
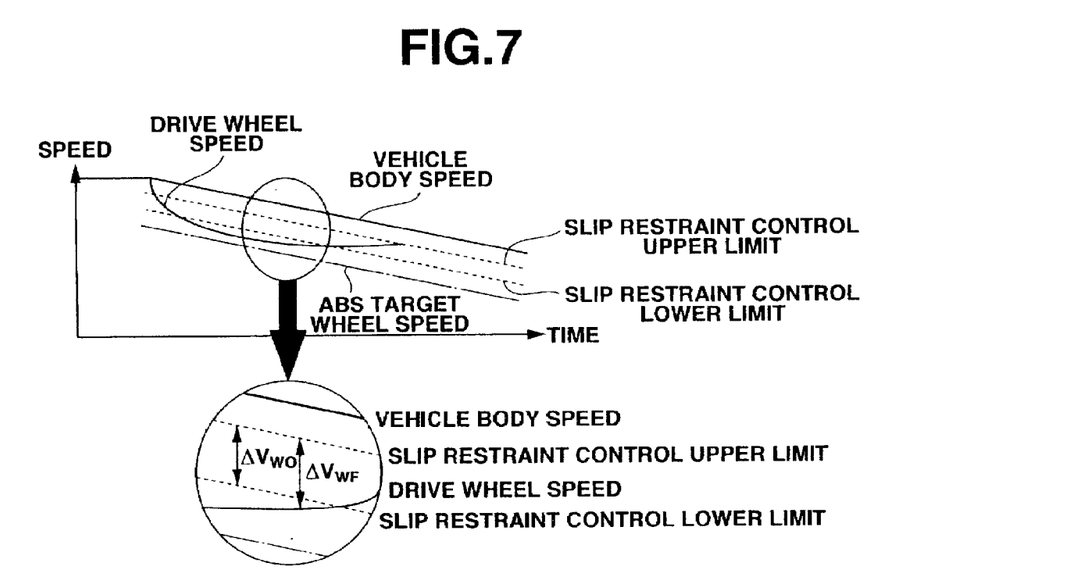
FIG. 7 is a timing chart illustrating time variation of a drive wheel speed determined by the process of FIG. 3.

Anti-skid control target wheel speed $VwABS$, slip restraint control upper limit $V^*wU$, slip restraint control lower limit $V^*wL$ and estimated vehicle body speed $Vc$ are related to one another in the following manner. Slip restraint control lower limit $V^*wL$ is limited on the lower side to anti-skid control target wheel speed $V^*wABS$, and hence the lower limit of the slip restraint control lower limit $V^*wL$ is equal to anti-skid control target wheel speed $V^*wABS$. Slip restraint control upper limit $V^*wU$ is limited on the upper side to vehicle body speed $Vc$ and the upper limit of slip restraint control upper limit $V^*wU$ is equal to estimated vehicle body speed $Vc$. The difference between slip restraint control upper and lower limits $V^*wU$ and $V^*wL$ is constantly equal to value $\Delta Vw0$. Therefore, as shown in FIG. 7, the control range of the slip restraint control is bounded between estimated vehicle body speed $Vc$ and anti-skid control target wheel speed $V^*wABS$. The control range of the slip restraint control is shifted downward (to a smaller value) as road surface friction coefficient $\mu$ increases, and shifted upward (to a greater value) as road surface friction coefficient $\mu$ decreases.

When the total braking force is too great with respect to road surface friction coefficient $\mu$, the wheel speed of each wheel becomes lower than anti-skid control target wheel speed $V^*wABS$ and the anti-skid brake control starts. In this case, the regenerative braking is canceled, as mentioned before, when the anti-skid brake control is started. Accordingly, only the front wheel speed becomes lower than estimated vehicle body speed $Vc$ and enters the slip restraint control range between upper and lower limits $V^*wU$ and $V^*wL$ when the front wheel braking force is excessive as compared to the rear wheel braking force, and the regenerative braking force exceeding the ideal braking force distribution is applied to the front wheels.

When average front (drive) wheel speed $VwF$ becomes lower than slip restraint control upper limit $V^*wU$, therefore, the brake control apparatus of this embodiment starts the slip restraint control to bring the actual braking force distribution between the front and rear axles, closer to the ideal braking force distribution by decreasing the front (drive) wheel braking force and increasing the rear (non-drive) wheel braking force. Then, until average front wheel speed $VwF$ reaches slip restraint lower limit $V^*wL$, the actual braking force distribution is shifted gradually to the ideal distribution in accordance with slip restraint control front wheel speed difference $\Delta VwF$. The actual braking force distribution reaches the ideal distribution when average front wheel speed $VwF$ reaches slip restraint control lower limit $V^*wL$. If, thereafter, average front wheel speed $VwF$ is returned to slip restraint control lower limit $V^*wL$, the brake control apparatus starts returning the actual braking force distribution from the ideal distribution toward the normal braking force distribution giving priority to the regenerative braking. Then, until average front wheel speed VwF reaches slip restraint upper limit V*wU, the actual braking force distribution is shifted gradually from the ideal distribution to the normal distribution preferentially using the regenerative braking, in accordance with slip restraint control front wheel speed difference ΔVwF. The actual braking force distribution reaches the normal distribution when average front wheel speed VwF reaches slip restraint control upper limit V*wU. Therefore, as shown in FIG. 7, the brake control apparatus can restrain a deceleration of the front (drive) wheel speed, and restrain the locking tendency by returning the wheel speed to the vehicle body speed. Thus, this brake control apparatus can control the front and rear wheel braking forces in the mode to achieve the ideal distribution before a start of the anti-skid brake control by a decrease of the average front wheel speed VwF below anti-skid brake control target wheels speed V*wABS serving as a threshold to start the ABS control. Thus, this brake control system can prevent early intervention of the anti-skid brake control by restraining the wheel locking tendency, and accordingly improves the energy recovery efficiency by enabling the regenerative braking in a wider range. Moreover, this brake control system varies the braking force distribution gradually between slip restraint control upper and lower limits V*wU and V*wL without abrupt change, and by so doing minimizes influences on the vehicle stability and vehicle behavior.

Between estimated vehicle body speed Vc and anti-skid control target wheel speed V*wABS, the range of the slip restraint control is set to lower positions (to smaller values) for higher values of road surface friction coefficient μ; and to upper positions (to greater values) for lower values of road surface friction coefficient μ. In other words, the timing of a start of the shift to the ideal braking force distribution is moved farther away from the anti-skid brake control range as road surface friction coefficient μ becomes lower. The timing of a start of the shift to the ideal braking force distribution is moved closer to the anti-skid brake control range as road surface friction coefficient μ becomes higher. Therefore, this system can achieve both of the prevention of drive wheel locking tendency in the case of lower road surface friction coefficient, and the energy recovery efficiency in the case of higher road surface friction coefficient with the regenerative braking.

With the slip restraint control range set in dependence on road surface friction coefficient μ, the average front wheel speed VwF tends to lower the slip restraint control upper limit V*wU earlier and more deep as road surface friction coefficient μ becomes lower. As road surface friction coefficient μ becomes lower, slip restraint control front wheel speed difference ΔVwF becomes greater at an early stage of the slip restraint control. Moreover, as explained before, slip restraint control correction coefficient α is set to greater values when road surface friction coefficient μ is lower for the same value of slip restraint control front wheel speed difference ΔVwF. Therefore, the slip restraint control correction quantity ΔT (determined by multiplication of slip restraint control front wheel speed difference ΔVwF and correction coefficient α) becomes greater especially at an early stage of the slip restraint control as road surface friction coefficient μ becomes lower. Therefore, in the case of lower road surface friction coefficient μ, the rate of change toward the ideal distribution becomes greater, and is increased at the early stage of the slip restraint slip control.

Therefore, the control system can restrain the drive wheel locking tendency securely in the case of lower road surface friction. In the case of higher road surface friction coefficient μ, on the other hand, the slip restraint control correction quantity ΔT is greater as road surface friction coefficient μ is higher, and the slip restraint control correction quantity ΔT is small even at the early stage of the slip restraint control. Therefore, the rate of change toward the ideal distribution in the case of higher road friction is smaller, and remains at a smaller level even at the early stage of the slip restraint slip control. Thus, the control system can ensure the energy recovery efficiency when the road surface friction coefficient μ is higher.

FIGS. 8~12 show a brake control apparatus according to a second embodiment of the present invention. In the second embodiment, the brake control apparatus is designed to achieve both the energy recovery efficiency on higher friction road and the drive wheel slip tendency restraint on lower friction road, without using road surface friction sensing device 11 shown in FIG. 1, by increasing the slip restraint control upper limit V*wU for use in second and subsequent control operations, when average front wheel speed VwF decreases below slip restraint control upper limit V*wU by a braking operation of the driver, and thereafter returns to the upper limit V*wU, that is, when the slip restraint control is once performed during the brake control. Cooperative regeneration control unit 12 of this example performs a control process shown in FIG. 8, instead of the process of FIG. 3.

Figure 8:
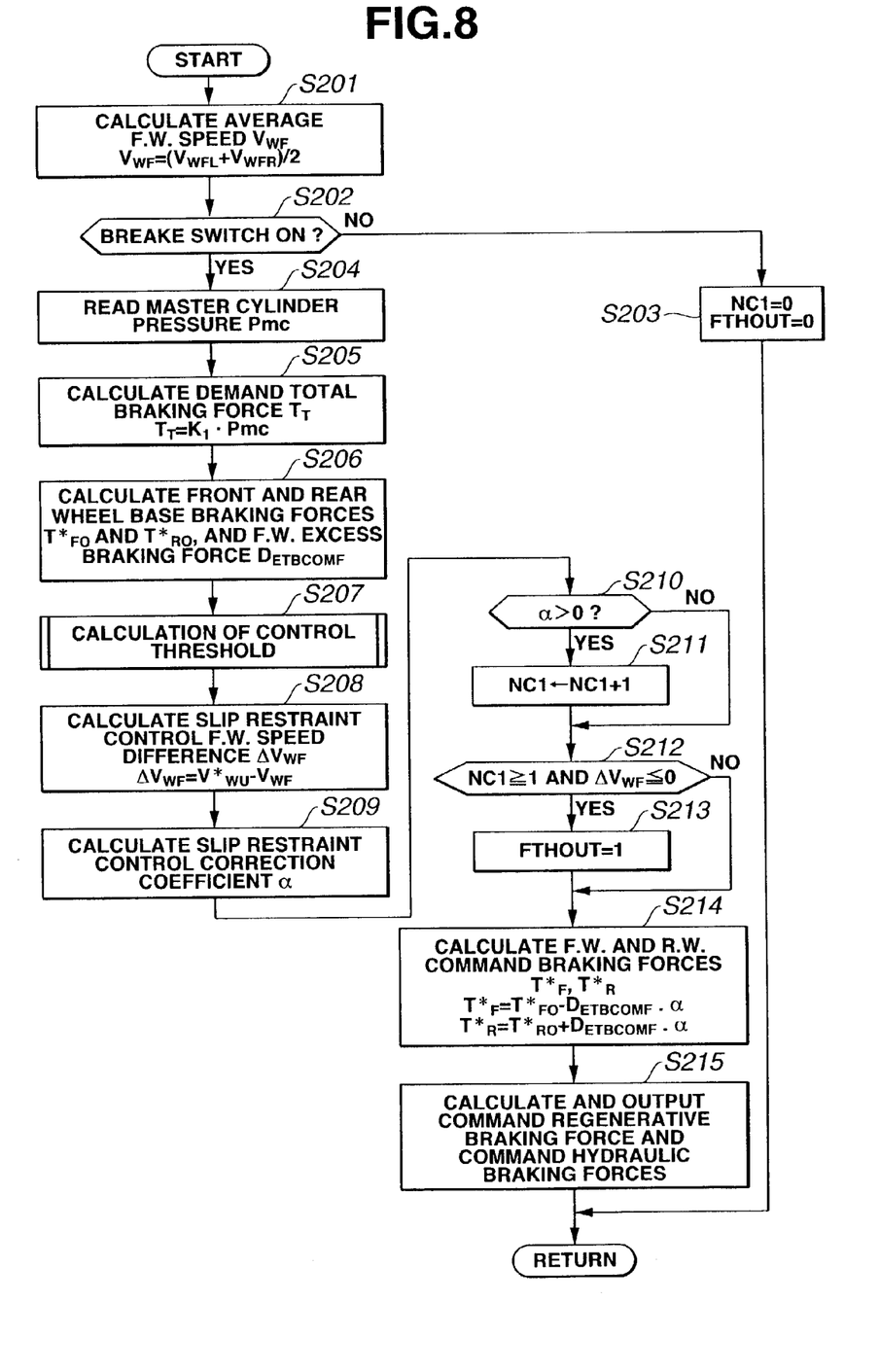
FIG. 8 is a flowchart showing a braking force calculation process according to a second embodiment of the present invention.

Step S201 calculates average front (drive) wheel speed VwF by averaging front left wheel speed VwFL and front right wheel speed VwFR. Step S202 checks the existence or nonexistence of driver's braking operation, by checking whether brake pedal switch 25 is ON or not. From step S202, regeneration control unit 12 proceeds to step S204 in the case of brake pedal switch 25 being ON, and to step S203 in the case of brake pedal switch 25 being OFF.

At step 203, regeneration control unit 12 resets a control end flag FTHOUT indicating execution of the slip restraint control responsive to a decrease of average front (drive) wheel speed VwF below slip restraint control upper limit V*wU, to zero (FTHOUT=0), and further resets a counter NC1 indicating the number of calculating operations during the slip restraint control, to zero (NC1=0). After step S203, regeneration control unit 12 returns to a main program.

On the other hand, step S204 reads master cylinder pressure Pmc supplied from brake fluid pressure control unit 7. Then, step S205 calculates demand total braking force TT by multiplying master cylinder pressure Pmc by predetermined proportionality coefficient K1.

Next step S206 calculates base front wheel and rear wheel braking forces T*F0 and T*R0 according to the driving force distribution shown in FIG. 2. Step S206 further calculates a front wheel excess braking force DETBCOMF by subtracting the front wheel braking force determined by the ideal braking force distribution, from the front wheel base braking force T*F0. Then, regeneration control unit 12 proceeds to step S207 and performs a control threshold calculating process to calculate slip restraint control lower limit V*wL and upper limit V*wU, as mentioned later.

At step S208 after step S207, regeneration control unit 12 calculates slip restraint control front wheel speed difference ΔVwF by subtracting the average front wheel speed VwF determined at step S201, from the slip restraint control upper limit V*wU determined at step S207 (ΔVwF=V*wU−VwF).

Figure 9:
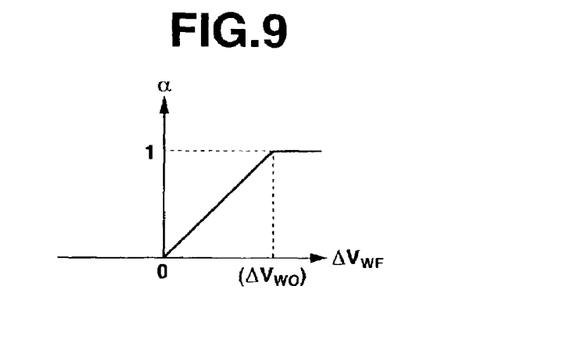
FIG. 9 is a graph showing a control map used at step S209 of FIG. 8.

At step S209, regeneration control unit 12 calculates slip restraint control correction coefficient α in accordance with the slip control front wheel speed difference $\Delta VwF$ determined at step S208, by using a control map shown in FIG. 9. This slip control correction coefficient $\alpha$ is equal to zero in the region in which slip restraint control front wheel speed difference $\Delta VwF$ is equal to or smaller than zero. This slip restraint control correction coefficient $\alpha$ is equal to one in the region in which slip restraint control front wheel speed difference $\Delta VwF$ is equal to or greater than predetermined value $\Delta Vw0$. Between 0 and $\Delta Vw0$, slip control correction coefficient $\alpha$ increases gradually (linearly in this example) from zero to one with increase in slip control front wheel speed difference $\Delta VwF$.

At step S210 following step S209, regeneration control unit 12 examines whether slip restraint control correction coefficient $\alpha$ determined at step S209 is greater than zero or not. From step S210, regeneration control unit 12 proceeds to step S211 when correction coefficient $\alpha$ is greater than zero, and to step S212 when correction coefficient $\alpha$ is equal to or smaller than zero. In the case of correction coefficient a being greater than zero, regeneration control unit 12 adds one to counter NC1 (NC1←NC1+1) at step S211, and then proceeds to step S212.

At step S212, regeneration control unit 12 examines whether, after average front wheel speed VwF decreases, by a braking operation of the driver, below slip restraint control upper limit V*wU, average front wheel speed VwF returns to the upper limit V*wU, by examining whether counter NC1 is equal to or greater than one, and at the same time, slip restraint control front wheel speed difference $\Delta VwF$ is equal to or smaller than zero (NC1$\geq$1 and $\Delta VwF \leq 0$). From step S212, regeneration control unit 12 proceeds to step S213 when the first condition of NC1$\leq$1, and the second condition of $\Delta VwF \leq 0$ are both satisfied, and proceeds to step S214 when at least one of the first and second conditions is not satisfied.

At step S213, regeneration control unit 12 sets control end flag FTHOUT to one, and then proceeds to step S214. At step S214, regeneration control unit 12 calculates command front wheel braking force T*F by subtracting a correction quantity (DETBCOMF·$\alpha$) determined by multiplying excess braking force DETBCOMF calculated at step S206, by slip restraint control correction coefficient $\alpha$ determined at step S209, from front wheel base braking force T*F0 determined at step S206 (T*F=T*F0−DETBCOMF·$\alpha$), and further calculates command rear wheel braking force T*R by adding the correction quantity (DETBCOMF·$\alpha$) to rear wheel base braking force T*R0 determined at step S206 (T*R=T*R0+DETBCOMF·$\alpha$)

At step S215 following step S214, regeneration control unit 12 calculates the command regenerative braking force, and command front and rear wheel hydraulic braking forces in accordance with command front and rear wheel braking forces T*F and T*R determined at step S214, in the same manner as in step S206. These results are outputted and control is transferred to a main program.

Figure 10:
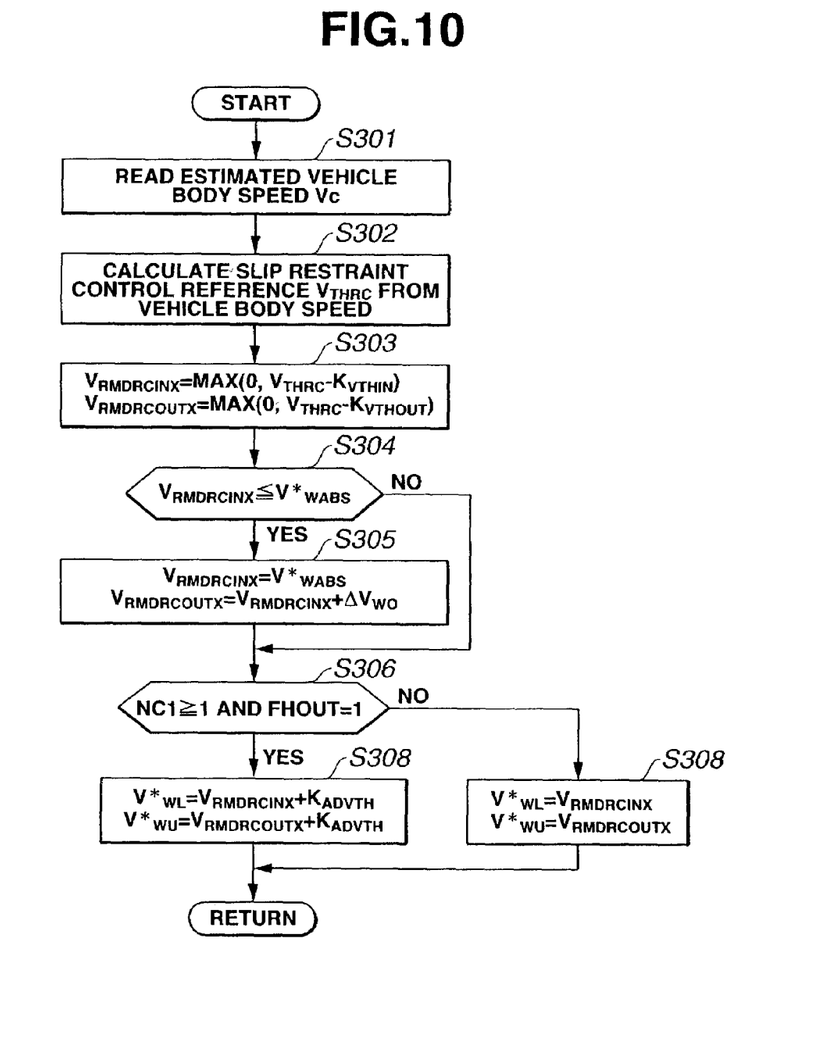
FIG. 10 is a flowchart showing a control threshold calculating process performed at step S207 of FIG. 8.

FIG. 10 shows the control threshold calculating process performed at step S207. At step S301, regeneration control unit 12 reads estimated vehicle body speed Vc from fluid pressure control unit 7. Then, at step S302, regeneration control unit 12 calculates a slip restraint control reference speed VTHRC from estimated vehicle body speed Vc, by linear interpolation of values in Table 1. Slip restraint control reference speed VTHRC increases as estimated vehicle body speed Vc increases. In the example of Table 1, this slip restraint reference speed VTHRC is equal to 98% of estimated vehicle body speed Vc when estimated vehicle body speed Vc is higher than 20 km/h. When estimated vehicle body speed Vc is lower than or equal to 20 km/h, the percentage for determining slip restraint reference speed VTHRC is decreased as estimated vehicle body speed Vc becomes lower. In this example, reference speed VTHRC is 97% of Vc when Vc=20 km/h, and 95% when Vc=10 km/h.

TABLE 1

| Vc (km/h) | 0 | 10 | 20 | 40 | 60 | 80 | ... |
|---|---|---|---|---|---|---|---|
| VTHRC (km/h) | 0 | 9.5 | 19.4 | 39.2 | 58.8 | 78.4 | ... |

When estimated vehicle body speed Vc decreases, slip restraint control upper limit V*wU is decreased by decreasing slip restraint control reference speed VTHRC with respect to estimated vehicle body speed Vcm. Therefore, in the very low vehicle speed region in which the locking tendency of the drive wheel during the anti-skid brake control is not so problematical, this control system can retard the timing to start the shift to the ideal braking force distribution, and thereby improve the energy recovery efficiency by regenerative braking. This control system can prevent useless intervention of the slip restraint control.

Then, at step S303, regeneration control unit 12 calculates slip restraint control reference lower and upper limits VRMDRCINX and VRMDRCOUTX in accordance with slip restraint control reference speed VTHRC determined at step S302, by using the following equations.

$$VRMDRCINX = MAX(0, VTHRC-KVTHIN)$$

$$VRMDRCOUTX = MAX(0, VTHRC-KVTHOUT) \quad (1)$$

In these equations, KVTHIN and KVTHOUT are both constants. In this example, KVTHIN is 2 km/h, and KVTHOUT is 1 km/h. Instead of using KVTHIN and KVTHOUT as constants, it is optional to vary quantities KVTHIN and KVTHOUT in accordance with road surface friction coefficient $\mu$ sensed by road surface friction sensor 11.

Thus, the control system according to the second embodiment calculates slip restraint control reference speed VTHRC in accordance with estimated vehicle body speed Vc, and determines slip restraint control reference lower and upper limits VRMDRCINX and VRMDRCOUTX by subtracting quantity KVTHIN or KVTHOUT from the reference speed VTHRC. Therefore, it is possible to tune the slip restraint control reference lower and upper limits VRMDRCINX and VRMDRCOUTX readily to various vehicles merely by modifying Table 1 and equations used for the calculation. By contrast, in the method of setting slip restraint control reference lower and upper limits VRMDRCINX and VRMDRCOUTX by subtracting constant KVTHIN or KVTHOUT from estimated vehicle body speed Vc, the control system requires a table and equations for calculating each of VRMDRCINX and VRMDRCOUTX, the system becomes complex, and the tuning becomes troublesome.

Then, at step S304, regeneration control unit 12 examines whether slip restraint control reference lower limit VRMDRCINX determined at step S303 is smaller than or equal to anti-skid brake control target wheel speed V*wABS determined by fluid pressure control unit 7. Regeneration control unit 12 proceeds to step S305 when VRMDRCINX$\leq$V*wABS, and to step S306 when VRMDRCINX>V*wABS.

At step S305, regeneration control unit 12 sets anti-skid brake control target wheel speed V*wABS to slip restraint control lower limit VRMDRCINX (VRMDRCINX=V*wABS), and setting, to slip restraint control reference upper limit VRMDRCOUTX, the sum of slip restraint control lower limit VRMDRCINX and the value ΔVw0 which is a difference between the constants KVTHIN and KVTHOUT (VRMDRCOUTX=VRMDRCINX+ΔVw0). Then, regeneration control unit 12 proceeds from step S305 to step S306.

At step S306, regeneration control unit 12 examines whether, during one braking operation of the driver, average front wheel speed VwF decreases below slip restraint control upper limit V*wU, and then average front wheel speed VwF returns to the upper limit V*wU, by examining whether counter NC1 is equal to or greater than one, and at the same time, slip restraint control front wheel speed difference ΔVwF calculated at step S208 is equal to or smaller than zero. Thus, it is examined whether the slip restraint control is executed at least once during one braking operation. From step S306, regeneration control unit 12 proceeds to step S308 when the first condition of NC1≧1, and the second condition of ΔVwF≦0 are both satisfied, and proceeds to step S307 when at least one of the first and second conditions is not satisfied.

At step S307, regeneration control unit 12 sets slip restraint control upper and lower limits V*wU and V*wL, respectively, equal to reference upper limit VRMDRCOUTX and reference lower limit VRMDRCINX (for the first cycle in the slip restraint control). That is, V*wU=VRMDRCOUTX and V*wL=VRMDRCINX.

Figure 11:
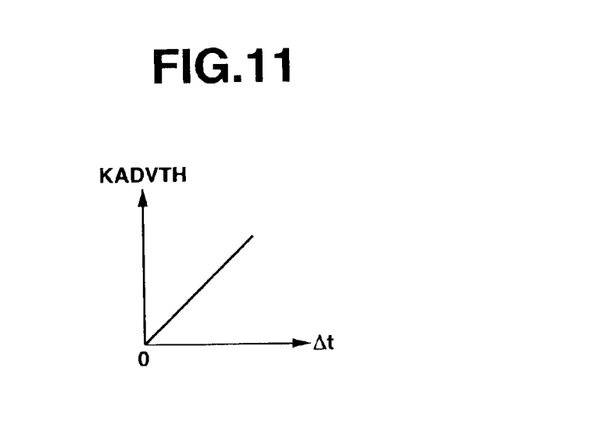
FIG. 11 is a graph showing a control map used at step S308 of FIG. 10.

At step S308, regeneration control unit 12 sets slip restraint control upper and lower limits V*wU and V*wL, respectively, equal to reference upper limit VRMDRCOUTX plus correction quantity KADVTH determined by a control map shown in FIG. 11, and reference lower limit VRMDRCINX plus the correction quantity KADVTH (for the second and subsequent cycles in the slip restraint control). That is, V*wU=VRMDRCOUTX+KADVTH, and V*wL=VRMDRCINX+KADVTH. Step S308 as well as step S307 uses reference upper and lower limits VRMDRCOUTX and VRMDRCINX calculated at step S303 or S306. Correction quantity KADVTH is dependent on a time Δt from the instant at which average front wheel speed VwF is decreased by a braking operation of the driver below slip restraint control upper limit V*wU, till average front wheel speed VwF is increased by the slip restraint control to slip restraint control upper limit V*wU. Correction quantity KADVTH is increased as time Δt increases. Time Δt is calculated by multiplying the control cycle (time) T by the counter NC1 (Δt=T·NC1).

In this example, correction quantity KADVTH is varied in accordance with the elapsed time Δt from a decrease of average front wheel speed VwF below slip restraint control upper limit V*wU, till a return of front wheel speed VwF to the upper limit V*wU. However, the present invention is not limited to this. For example, it is optional to vary the correction quantity KADVTH in accordance with a time from a decrease of average front wheel speed VwF below slip restraint control lower limit V*wL, till a return of front wheel speed VwF to the lower limit V*wL.

Figure 12:
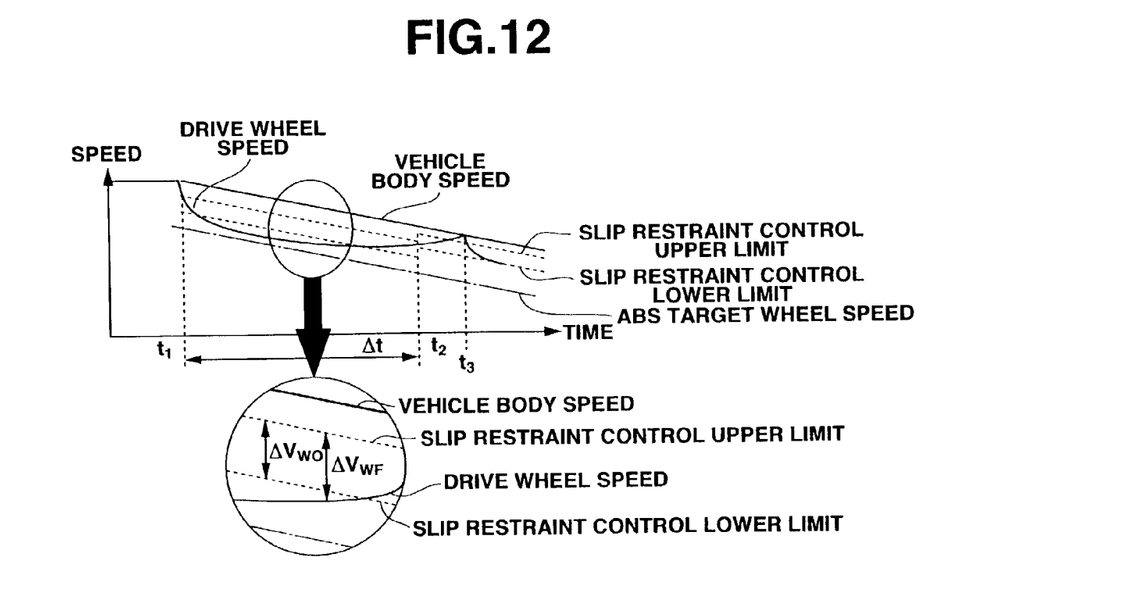
FIG. 12 is a timing chart illustrating time variation of the drive wheel speed determined by the process of FIG. 8.

When, as shown in FIG. 12, average front (drive) wheel speed VwF becomes lower than slip restraint control upper limit V*wU (at an instant t1), the brake control apparatus of the second embodiment starts the counting of counter NC1, and starts the slip restraint control to bring the actual braking force distribution between the front and rear axles closer to the ideal distribution by decreasing the front (drive) wheel braking force and increasing the rear (non-drive) wheel braking force. Then, until average front wheel speed VwF reaches slip restraint lower limit V*wL, the actual braking force distribution is shifted gradually to the ideal distribution in accordance with slip restraint control front wheel speed difference ΔVwF. The actual braking force distribution reaches the ideal distribution when average front wheel speed VwF reaches slip restraint control lower limit V*wL. If, thereafter, average front wheel speed VwF is returned to slip restraint control lower limit V*wU, the brake control apparatus starts returning the actual brake force distribution from the ideal distribution toward the normal braking force distribution giving priority to the regenerative braking. Then, until average front wheel speed VwF reaches slip restraint upper limit V*wU, the actual braking force distribution is shifted gradually from the ideal distribution to the normal distribution preferentially using the regenerative braking, in accordance with slip restraint control front wheel speed difference ΔVwF. When average front wheel speed VwF reaches slip restraint control upper limit V*wU, the control apparatus finishes the shift of the actual braking force distribution to the normal distribution, and sets control end flag FTHOUT to one (at instant t2).

When control end flag FTHOUT is set to one, the brake control apparatus of this embodiment increases slip restraint control upper limit V*wU by adding correction quantity KADVTH to slip restraint control reference upper limit VRMDRCOUTX (V*wU=VRMDRCOUTX+KADVTH), and thereby shifts the timing of start of the shift of the actual braking force distribution to the ideal distribution away from the anti-skid brake control range. (In this example, from instant t2 to a return of average front wheel speed VwF to slip restraint control upper limit V*wU determined by addition of correction quantity KADVTH, the control system holds the front and rear braking force distribution in the state at instant t2.) Therefore, if average front wheel speed VwF decreases again, the control system can start the shift to the ideal braking force distribution earlier (at instant t3), and thereby prevent the drive wheel locking securely on low friction road surface. When road surface friction coefficient μ is low, the wheel deceleration becomes higher. Therefore, in the case of low friction coefficient μ, this control system moves the slip restraint control upper limit upward closer to estimated vehicle body speed Vc and thereby starts the slip restraint control timely. If slip restraint control upper limit V*wU is increased from the beginning, the shift to the ideal distribution is started readily even in the case of high friction coefficient, so that the energy recovery efficiency of the regenerative braking is made worse. The brake control system prevents a decrease of the energy recovery efficiency on high friction roads and securely prevent drive wheel locking.

In this case, slip restraint control lower limit V*wL is increases by addition of correction quantity KADVTH to reference lower limit VRMDRCINX simultaneously, and thereby shifts the timing of ending the shift to the ideal braking force distribution away from the anti-skid brake control range. By so doing, the brake control apparatus of this embodiment can restrain the tendency of drive wheel locking reliably.

Correction quantity KADVTH is increased in accordance with elapsed time Δt till regain of drive wheel speed VwF. Therefore, when average front wheel speed VwF cannot regain its speed soon because of low friction coefficient, the control system of this embodiment increases the slip restraint control upper and lower limits V*wU and V*wL by a greater value of correction quantity KADVTH, and thereby shifts the slip restraint control range away from the anti-skid brake control range, toward estimated vehicle body speed Vc. Thus, this control system can prevent drive wheel locking tendency adequately in the case of low friction coefficient.

In the illustrated embodiments, hydraulic circuit 6 and hydraulic system 8 can serve as a brake section to apply a regenerative braking force to the motor-driven (front) wheels driven by the motor, and applying hydraulic braking forces to the wheels of the vehicle. Cooperative regeneration control unit 12 alone or in combination with control unit 7 and/or 9 serves a control section to vary the regenerative braking force in the direction to shift the front and rear wheel braking force distribution toward the ideal braking force distribution, in accordance with a wheel locking tendency of the motor-driven wheel. The wheel locking tendency may be ΔVwF, Vc−VwF, a wheel slip rate, a wheel slip quantity or some other parameter representing a wheel locking or slipping condition. Hybrid system control unit 9 can serve as motor regulating means for varying a regenerative braking force applied to the drive wheels. Steps S12 and S208 and/or control unit 7 can correspond to wheel locking condition sensing means for sensing a wheel locking condition of the drive wheels. Regeneration control unit 12 can correspond to braking force controlling means for varying the regenerative braking force in the direction to shift the actual front and rear wheel braking force distribution of the vehicle toward the ideal braking force distribution.

This application is based on prior Japanese Patent Applications No. 2001-298529 filed in Japan on Sep. 27, 2001, and No. 2002-194241 filed in Japan on Jul. 3, 2002. The entire contents of these Japanese Patent Applications are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus for a vehicle, comprising:
    a brake section to apply a regenerative braking force to a motor-driven wheel driven by a motor;
    a control section to vary the regenerative braking force in a direction to shift a front and rear wheel braking force distribution toward an ideal braking force distribution, in accordance with a wheel locking tendency of the motor-driven wheel when the regenerative braking force exceeding a braking force determined by the ideal braking force distribution is applied to the motor-driven wheel; and
    a sensing section to sense the wheel locking tendency of the motor-driven wheel;
    wherein the brake section is arranged to vary the front and rear wheel braking force distribution by manipulating a braking force of the motor-driven wheel and a braking force of a motor-non-driven wheel which is not driven by the motor in accordance with a brake control signal from the control section;
    wherein the control section controls the brake section to control actual front and rear wheel braking forces in a normal brake control mode when the wheel locking tendency is outside a slip restraint control range, and controls the brake section to control the actual front and rear wheel braking forces in a slip restraint brake control mode to shift the front and rear wheel braking force distribution toward the ideal braking force distribution, in accordance with the wheel locking tendency sensed by the sensing section;
    wherein the sensing section comprises a road surface friction sensing subsection to sense a road surface friction coefficient;
    wherein the control section modifies a characteristic of a brake control in the slip restraint mode in accordance with the road surface friction coefficient to increase effect of the brake control in the slip restraint mode when the road surface friction coefficient becomes lower; and
    wherein the control section varies the braking force to the motor-driven wheel by a correction quantity in the slip restraint mode, and calculates the correction quantity in accordance with the wheel locking tendency and the road surface friction quantity so that the correction quantity increases as the wheel locking tendency increases and the correction quantity increases as the road surface friction coefficient decreases.

2. The brake control apparatus as claimed in claim 1, wherein the control section comprises an anti-skid brake control section to control the brake section in an anti-skid brake control mode, and to cancel a regenerative braking in the anti-skid brake control mode, and a slip restraint control section to vary the regenerative braking force in the direction toward the ideal braking force distribution, in accordance with the wheel locking tendency of the motor-driven wheel before a start of a brake control in the anti-skid brake control mode.

3. The brake control apparatus as claimed in claim 1, wherein the control section shifts the front and rear wheel braking force distribution at a gradual rate of change toward the ideal braking force distribution.

4. The brake control apparatus as claimed in claim 1, wherein the control section shifts the front and rear wheel braking force distribution at a predetermined rate of change toward the ideal braking force distribution, and the control section increases the rate of change as the road surface friction coefficient becomes lower.

5. The brake control apparatus as claimed in claim 1, wherein the control section shifts the front and rear wheel braking force distribution at a predetermined rate of change toward the ideal braking force distribution, and wherein, as the road surface friction coefficient becomes lower, the control section increases the rate of change in an early stage than in a later stage of the brake control in the slip restraint mode.

6. The brake control apparatus as claimed in claim 1, wherein the control section shifts a start of the brake control in the slip restraint mode toward an anti-skid brake control range of an anti-skid brake control as the road surface friction coefficient becomes higher; and wherein the control section shifts the start of the brake control in the slip restraint mode away from the anti-skid brake control range of the anti-skid brake control as the road surface friction coefficient becomes lower.

7. A brake control apparatus for a vehicle, comprising:
    a brake section to apply a regenerative braking force to a motor-driven wheel driven by a motor;
    a control section to vary the regenerative braking force in a direction to shift a front and rear wheel braking force distribution toward an ideal braking force distribution, in accordance with a wheel locking tendency of the motor-driven wheel when the regenerative braking force exceeding a braking force determined by the ideal braking force distribution is applied to the motor-driven wheel; and a sensing section to sense the wheel locking tendency of the motor-driven wheel;

wherein the brake section is arranged to vary the front and rear wheel braking force distribution by manipulating a braking force of the motor-driven wheel and a braking force of a motor-non-driven wheel which is not driven by the motor in accordance with a brake control signal from the control section;

wherein the control section controls the brake section to control actual front and rear wheel braking forces in a normal brake control mode when the wheel locking tendency is outside a slip restraint control range, and controls the brake section to control the actual front and rear wheel braking forces in a slip restraint brake control mode to shift the front and rear wheel braking force distribution toward the ideal braking force distribution, in accordance with the wheel locking tendency sensed by the wheel locking tendency sensing section;

wherein the control section comprises an anti-skid brake control section to control the brake section in an anti-skid brake control mode, and to cancel a regenerative braking in the anti-skid brake control mode, and a slip restraint control section to vary the regenerative braking force in the direction toward the ideal braking force distribution, gradually in accordance with the wheel locking tendency of the motor-driven wheel before a start of a brake control in the anti-skid brake control mode;

wherein the anti-skid brake control section starts the brake control in the anti-skid brake control mode when the wheel locking tendency of the motor-driven wheel is greater than or equal to an ABS start threshold; and the slip restraint control section starts the brake control in the slip restraint brake control mode to shift the front and rear wheel braking force distribution gradually toward the ideal braking force distribution when the wheel locking tendency of the motor-driven wheel becomes greater than or equal to a first slip restraint control threshold which is smaller than the ABS start threshold, and allows the brake control in the normal brake control mode when the wheel locking tendency of the motor-driven wheel is smaller than the first slip restraint control threshold; and wherein the slip restraint control section ends the shift of the front and rear wheel braking force distribution to the ideal braking force distribution when the wheel locking tendency of the motor-driven wheel becomes greater than or equal to a second slip restraint control threshold which is smaller than the ABS start threshold, and which is greater than the first slip restraint threshold.

8. The brake control apparatus as claimed in claim 7, wherein the sensing section comprises a brake operation sensing subsection to sense a driver's braking operation, and the control section decreases one of the first and second slip restraint control thresholds when the wheel locking tendency of the motor-driven wheel increases beyond a predetermined level and thereafter the wheel locking tendency decreases below the predetermined level during the driver's braking operation.

9. The brake control apparatus as claimed in claim 8, wherein the control section decreases one of the first and second slip restraint control thresholds with increase in a time during the driver's braking operation from an instant when the wheel locking tendency of the motor-driven wheel increases beyond the predetermined level to an instant when the wheel locking tendency decreases below the predetermined level, and wherein the predetermined level is one of the first and second slip restraint control thresholds.

10. The brake control apparatus as claimed in claim 7, wherein the sensing section comprises a brake operation sensing section to sense a driver's braking operation, and the control section decreases one of the first and second slip restraint thresholds when the wheel locking tendency of the motor-driven wheel increases beyond a predetermined level and thereafter the wheel locking tendency decreases below the predetermined level during the driver's braking operation.

11. The brake control apparatus as claimed in claim 7, wherein the control section calculates a reference speed in accordance with a vehicle body speed, and determines the first slip restraint control threshold by subtracting a predetermined first value from the reference speed, and the second slip restraint control threshold by subtracting a predetermined second value from the reference speed.

12. The brake control apparatus as claimed in claim 7, wherein the control section decreases a ratio of the first slip restraint control threshold to a vehicle body speed as the vehicle body speed decreases.

13. A brake control apparatus for a vehicle, comprising:

a brake section to apply a regenerative braking force to a motor-driven wheel driven by a motor; and a control section to vary the regenerative braking force in a direction to shift a front and rear wheel braking force distribution toward an ideal braking force distribution, in accordance with a wheel locking tendency of the motor-driven wheel when the regenerative braking force exceeding a braking force determined by the ideal braking force distribution is applied to the motor-driven wheel;

wherein the control section is configured:

to calculate a first base braking force and a second base braking force in accordance with a driver's braking operation;

to control an actual first axle braking force and an actual second axle braking force in accordance with the first base braking force and the second base braking force in a normal control mode;

to calculate a first modified braking force by decreasing the first base braking force, and a second modified braking force by increasing the second base braking force when a first wheel speed of the motor-driven wheel becomes lower than a slip restraint control upper limit; and to control the actual first axle braking force and the actual second axle braking force in a slip restraint control mode in accordance with the first modified braking force and the second modified braking force when the first wheel speed of the motor-driven wheel is lower than the slip restraint control upper limit; and wherein the control section is configured to calculate the wheel locking tendency from a wheel speed of the motor-driven wheel; to further calculate a slip restraint control correction quantity in accordance with the wheel locking tendency; and to calculate the first modified braking force by subtracting the slip restraint control correction quantity from the first base braking force, and the second modified braking force by adding the slip restraint control quantity to the second base braking force when the wheel speed of the motor-driven wheel becomes lower than the slip restraint upper limit.

14. A brake control process for a vehicle having a brake system to apply a regenerative braking force to a motor-driven wheel driven by a motor, comprising:

calculating a wheel locking tendency of the motor-driven wheel which is driven by the motor;

varying the regenerative braking force to the motor-driven wheel in a direction to shift a front and rear wheel braking force distribution of the vehicle at a rate of change toward an ideal braking force distribution, in accordance with the wheel locking tendency of the motor-driven wheel when the regenerative braking force exceeding a braking force determined by the ideal braking force distribution is applied to the motor-driven wheel, the rate of change being increased as a road surface friction coefficient sensed by a road surface friction sensor becomes lower;

varying the front and rear wheel braking force distribution by manipulating a braking force of the motor-driven wheel and a braking force of a motor-non-driven wheel which is not driven by the motor in accordance with a brake control signal;

controlling actual front and rear wheel braking forces in a normal brake control mode when the wheel locking tendency is outside a slip restraint control range, and controlling the actual front and rear wheel braking forces in a slip restraint brake control mode to shift the front and rear wheel braking force distribution toward the ideal braking force distribution, in accordance with the calculated wheel locking tendency;

sensing a road surface friction coefficient;

modifying a characteristic of a brake control in the slip restraint mode in accordance with the road surface friction coefficient to increase effect of the brake control in the slip restraint mode when the road surface friction coefficient becomes lower; and varying the braking force to the motor-driven wheel by a correction quantity in the slip restraint mode, and calculating the correction quantity in accordance with the wheel locking tendency and the road surface friction quantity so that the correction quantity increases as the wheel locking tendency increases and the correction quantity increases as the road surface friction coefficient decreases.

15. A brake control apparatus for a vehicle having a motor for driving drive wheels, comprising:

motor regulating means for varying a regenerative braking force applied to the drive wheels;

wheel locking condition sensing means for sensing a wheel locking condition of the drive wheels;

road surface friction coefficient sensing means for sensing a road surface friction coefficient; and braking force controlling means for varying the regenerative braking force in a direction to shift a front and rear wheel braking force distribution of the vehicle toward an ideal braking force distribution, in accordance with the wheel locking condition when the regenerative braking force exceeding a braking force determined by the ideal braking force distribution is applied to the drive wheels, the braking force controlling means including means for shifting a start of a brake control in a slip restraint mode toward an anti-skid brake control range of an anti-skid brake control as the road surface friction coefficient sensed by the road surface friction coefficient sensing means becomes higher, and for shifting the start of the brake control in the slip restraint mode away from the anti-skid brake control range of the anti-skid brake control as the road surface friction coefficient becomes lower, the motor regulating means including a means for varying the front and rear wheel braking force distribution by manipulating a braking force of the motor-driven wheel and a braking force of a motor-non-driven wheel which is not driven by the motor in accordance with a brake control signal from the braking force controlling means;

the braking force controlling means including means for modifying a characteristic of a brake control in the slip restraint mode in accordance with the road surface friction coefficient to increase effect of the brake control in the slip restraint mode when the road surface friction coefficient becomes lower, and the braking force controlling means including means for varying the braking force to the motor-driven wheel by a correction quantity in the slip restraint mode, and calculating the correction quantity in accordance with the wheel locking tendency and the road surface friction quantity so that the correction quantity increases as the wheel locking tendency increases and the correction quantity increases as the road surface friction coefficient decreases.

* * * * *